United States Patent
Chang

(10) Patent No.: US 6,955,373 B2
(45) Date of Patent: Oct. 18, 2005

(54) SHOCK-ABSORBING FRAME FOR BICYCLE.

(76) Inventor: Wen-Pin Chang, P.O. Box 55-124, Taichung (TW)

( * ) Notice: Subject to any disclaimer, the term of this patent is extended or adjusted under 35 U.S.C. 154(b) by 0 days.

(21) Appl. No.: 10/760,282

(22) Filed: Jan. 21, 2004

(65) Prior Publication Data

US 2005/0156400 A1    Jul. 21, 2005

(51) Int. Cl.[7] ............................................. B62K 25/28
(52) U.S. Cl. ...................................... 280/284; 280/275
(58) Field of Search ..................... 280/281.1, 283–286, 280/288, 274, 275

(56) References Cited

U.S. PATENT DOCUMENTS

| | | | | |
|---|---|---|---|---|
| 5,725,227 A | * | 3/1998 | Mayer | 280/284 |
| 5,785,339 A | * | 7/1998 | Mamiya et al. | 280/283 |
| 6,386,567 B1 | * | 5/2002 | Schonfeld | 280/283 |
| 6,880,847 B2 | * | 4/2005 | Chamberlain et al. | 280/284 |
| 6,893,036 B2 | * | 5/2005 | Groendal et al. | 280/275 |

* cited by examiner

Primary Examiner—Matthew Luby

(57) ABSTRACT

A shock-absorbing frame for a bicycle includes a first body, a middle body, a shock-absorbing device, a second body, and two holders. Thus, the middle body and the second body are rotated on the opposite directions, and the drive chain wheel and the driven chain wheel are moved upward and forward simultaneously, so that the distance between the drive chain wheel and the driven chain wheel is kept at a constant, thereby preventing the chain mounted between the drive chain wheel and the driven chain wheel from becoming loosened or detached, so that the chain is mounted between the drive chain wheel and the driven chain wheel rigidly and stably without detachment so as to protect the rider's safety.

12 Claims, 4 Drawing Sheets

SHOCK-ABSORBING FRAME FOR BICYCLE.

BACKGROUND OF THE INVENTION

1. Field of the Invention

The present invention relates to a shock-absorbing frame, and more particularly to a shock-absorbing frame for a bicycle, wherein the distance between the drive chain wheel and the driven chain wheel is kept at a constant, so that the chain is mounted between the drive chain wheel and the driven chain wheel rigidly and stably without detachment so as to protect the rider's safety.

2. Description of the Related Art

A conventional shock-absorbing frame for a bicycle in accordance with the prior art shown in FIGS. 1–3 comprises a first body 1, a second body 2, a rear fork 3, a shock-absorbing device 4, and two levers 5. The first body 1 includes a head tube 103, a top tube 102, a bottom tube 104, and a seat tube 106. The seat tube 106 has a lower end formed with a pivot tube 105. The lower end of the seat tube 106 is provided with a protruding connecting seat 108 located adjacent to the pivot tube 105. The second body 2 is pivotally mounted on the first body 1 and includes two arms 202 each having a first end pivotally mounted on the connecting seat 108 by a first pivot shaft 204 and a second end snapped onto a wheel axle 702 of a rear wheel 7 of the bicycle. The rear fork 3 includes two fork arms 302 each having a first end pivotally mounted on the second end of a respective one of the arms 202 of the second body 2 and a second end formed with a connecting post 304. The shock-absorbing device 4 includes a cylinder 402 and a piston rod 404 retractably mounted on the cylinder 402 and has a first end pivotally mounted on a connecting block 1042 on the bottom tube 104. Each of the two levers 5 has a first end pivotally mounted on the connecting post 304 of a respective one of the fork arms 302 of the rear fork 3, a mediate portion pivotally mounted on the seat tube 106 by a second pivot shaft 502 and a second end pivotally mounted on a second end of the shock-absorbing device 4. A drive unit 8 includes a driven chain wheel 802 mounted on the wheel axle 702 of the rear wheel 7, a rotation shaft 806 mounted on the pivot tube 105, a drive chain wheel 804 mounted on the rotation shaft 806, and a chain 803 mounted between the drive chain wheel 804 and the driven chain wheel 802.

As shown in FIG. 2, when the seat tube 106 is subjected to a downward force from a rider's weight, the front wheel 6 is subjected to a reaction from the ground, so that the first body 1 is rotated about the first pivot shaft 204, while the rear wheel 7 is subjected to the reaction from the ground, so that the second body 2 is rotated about the first pivot shaft 204. At this time, the shock-absorbing device 4 exerts a force on the two levers 5 to drive the rear fork 3 to press the wheel axle 702 of the rear wheel 7, thereby forming a force balance state.

As shown in FIG. 3, when the bicycle is ridden on a rugged road, the front wheel 6 and the rear wheel 7 are subjected to the reaction from the ground, so that the first body 1 and the second body 2 are rotated about the first pivot shaft 204. At this time, the shock-absorbing device 4 is compressed to reduce the vibration due to rotation of the rear wheel 7, thereby providing a shock-absorbing effect.

However, when the first body 1 and the second body 2 are rotated relative to each other, the wheel axle 702 of the rear wheel 7 and the driven chain wheel 802 are moved relative to drive chain wheel 804 about the first pivot shaft 204, thereby reducing the distance between the drive chain wheel 804 and the driven chain wheel 802, so that the chain 803 mounted between the drive chain wheel 804 and the driven chain wheel 802 easily becomes loosened or detached, thereby causing inconvenience and danger to the rider.

SUMMARY OF THE INVENTION

The primary objective of the present invention is to provide a shock-absorbing frame for a bicycle, wherein the middle body and the second body are rotated on the opposite directions, and the drive chain wheel and the driven chain wheel are moved upward and forward simultaneously, so that the distance between the drive chain wheel and the driven chain wheel is kept at a constant, thereby preventing the chain mounted between the drive chain wheel and the driven chain wheel from becoming loosened or detached, so that the chain is mounted between the drive chain wheel and the driven chain wheel rigidly and stably without detachment so as to protect the rider's safety.

In accordance with one embodiment of the present invention, there is provided a shock-absorbing frame for a bicycle, comprising a first body, a middle body, a shock-absorbing device, a second body, and two holders, wherein:

the first body includes a top tube, and a positioning member having a first end integrally formed on a mediate portion of the top tube and a second end extended downward and backward in an oblique manner;

the middle body is pivotally mounted on the top tube of the first body and includes a seat tube located beside the second end of the top tube of the first body, a first arm pivotally mounted on the second end of the top tube of the first body by a first pivot shaft and having a first end mounted on a mediate portion of the seat tube and a second end extended downward and forward in an oblique manner, and a second arm having a first end mounted on the second end of the first arm and a second end extended downward and backward in an oblique manner;

the shock-absorbing device is mounted between the first body and the middle body and has a first end pivotally mounted on the mediate portion of the top tube and a second end pivotally mounted on the second end of the first arm;

the second body is pivotally mounted on the positioning member of the first body and includes two third arms each having a first end pivotally mounted on the second end of the positioning member of the first body by a second pivot shaft and a second end formed with a snap hole; and each of the two holders is mounted between the middle body and the second body.

In accordance with another embodiment of the present invention, there is provided a shock-absorbing frame for a bicycle, comprising a first body, a middle body, a first shock-absorbing device, a second body, a rear fork, and a second shock-absorbing device, wherein:

the first body includes a top tube, and a positioning member having a first end integrally formed on a mediate portion of the top tube and a second end extended downward and backward in an oblique manner;

the middle body is pivotally mounted on the top tube of the first body and includes a seat tube located beside the second end of the top tube of the first body, a first arm pivotally mounted on the second end of the top tube of the first body by a first pivot shaft and having a first end mounted on a mediate portion of the seat tube and a second end extended downward and forward in an oblique manner, and a second arm having a first end mounted on the second end of the first arm and a second end extended downward and backward in an oblique manner;

the first shock-absorbing device is mounted between the first body and the middle body and has a first end pivotally mounted on the mediate portion of the top tube and a second end pivotally mounted on the second end of the first arm;

the second body is pivotally mounted on the positioning member of the first body and includes two third arms each having a first end pivotally mounted on the second end of the positioning member of the first body by a second pivot shaft and a second end formed with a snap hole;

the rear fork includes two levers each having a first end pivotally mounted on the second end of a respective one of the third arms of the second body; and the second shock-absorbing device is mounted between the middle body and the rear fork.

Further benefits and advantages of the present invention will become apparent after a careful reading of the detailed description with appropriate reference to the accompanying drawings.

DETAILED DESCRIPTION OF THE INVENTION

Figure 1:
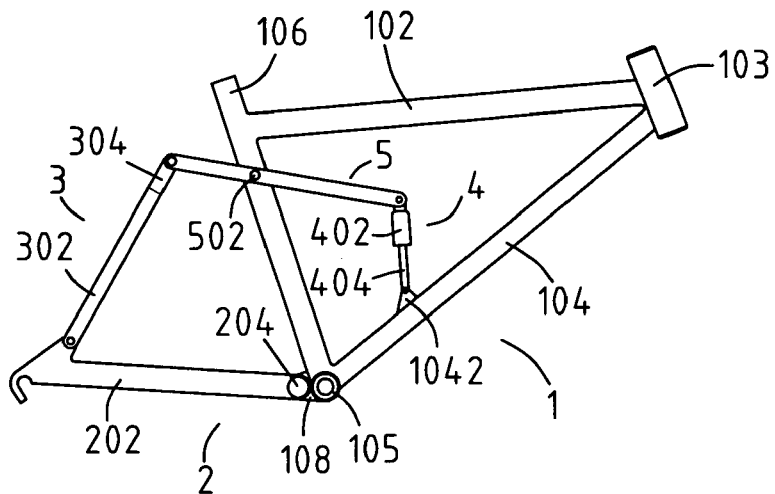
FIG. 1 is a side plan view of a conventional frame in accordance with the prior art.
Figure 2:
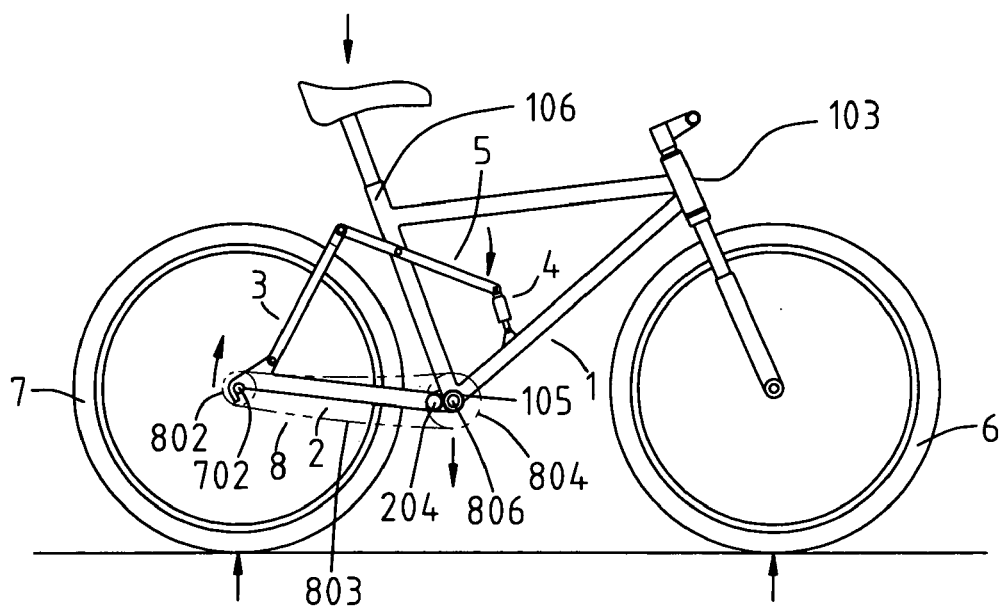
FIG. 2 is a side plan view of the conventional frame for a bicycle in accordance with the prior art.
Figure 3:
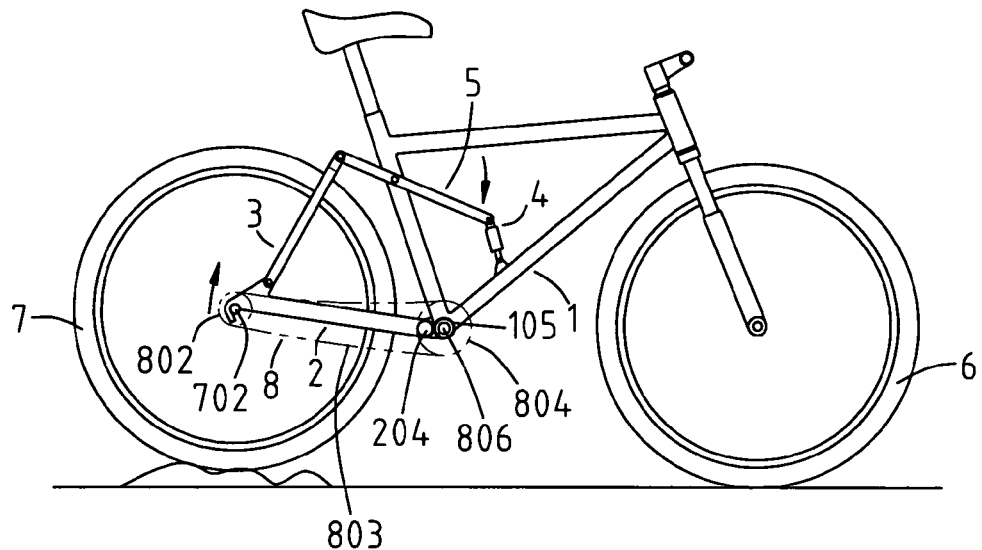
FIG. 3 is a schematic operational view of the conventional frame for a bicycle as shown in FIG. 2.
Figure 4:
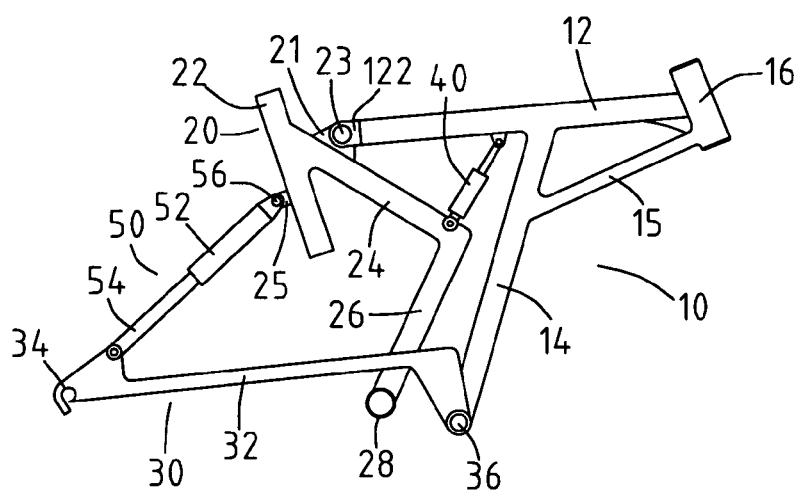
FIG. 4 is a side plan view of a shock-absorbing frame in accordance with a first embodiment of the present invention.
Figure 5:
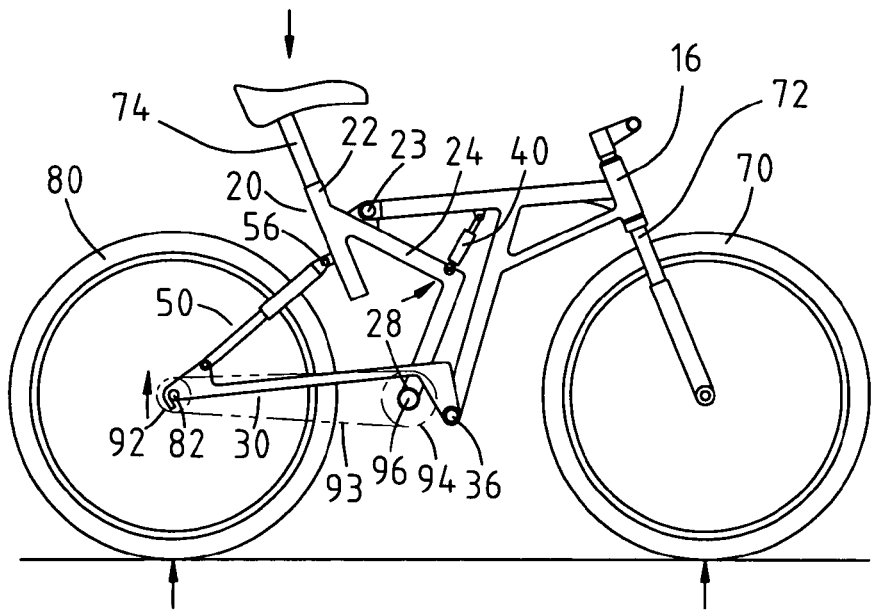
FIG. 5 is a side plan view of the shock-absorbing frame for a bicycle in accordance with the first embodiment of the present invention.

Referring to the drawings and initially to FIGS. 4 and 5, a shock-absorbing frame for a bicycle in accordance with a first embodiment of the present invention comprises a first body 10, a middle body 20, a shock-absorbing device 40, a second body 30, and two holders 50.

The first body 10 includes a top tube 12, a positioning member 14 having a first end integrally formed on a mediate portion of the top tube 12 and a second end extended downward and backward in an oblique manner, a head tube 16 mounted on a first end of the top tube 12 for mounting a front fork 72 of a front wheel 70 of the bicycle, and a reinforcement member 15 having a first end mounted on the head tube 16 and located under the top tube 12, and a second end mounted on a mediate portion of the positioning member 14 and located adjacent to the top tube 12 to strengthen the positioning member 14. Preferably, the positioning member 14 of the first body 10 is an elongated tube. The top tube 12 of the first body 10 has a forked second end formed with two axially extended ears 122.

The middle body 20 is pivotally mounted on the top tube 12 of the first body 10 and includes a seat tube 22, a first arm 24, and a second arm 26 which are formed integrally.

The seat tube 22 of the middle body 20 is located beside the second end of the top tube 12 of the first body 10 and extended downward and forward in an oblique manner for mounting a seat post 74 of the bicycle. The seat tube 22 of the middle body 20 is formed with two spaced connecting members 25.

The first arm 24 of the middle body 20 is pivotally mounted on the second end of the top tube 12 of the first body 10 and has a first end mounted on a mediate portion of the seat tube 22 and a second end extended downward and forward in an oblique manner. The first end of the first arm 24 of the middle body 20 is formed with a pivot member 21 pivotally mounted between the two ears 122 of the top tube 12 by a first pivot shaft 23, so that the middle body 20 is pivoted about the first pivot shaft 23.

The second arm 26 of the middle body 20 has a first end mounted on the second end of the first arm 24 and a second end extended downward and backward in an oblique manner. The second end of the second arm 26 of the middle body 20 is formed with a pivot tube 28 for mounting a rotation shaft 96 of a drive chain wheel 94 of the bicycle.

The shock-absorbing device 40 is mounted between the top tube 12 of the first body 10 and the first arm 24 of the middle body 20 and has a first end pivotally mounted on the mediate portion of the top tube 12 and a second end pivotally mounted on the second end of the first arm 24.

The second body 30 is pivotally mounted on the positioning member 14 of the first body 10 and includes two third arms 32 each having a first end pivotally mounted on the second end of the positioning member 14 of the first body 10 by a second pivot shaft 36 and a second end formed with a snap hole 34 pivotally snapped onto a wheel axle 82 of a rear wheel 80 of the bicycle. The second pivot shaft 36 is located at a level lower than that of the snap hole 34, so that a connecting line between the second pivot shaft 36 and the wheel axle 82 of the rear wheel 80 is disposed at an inclined state and has a lower front end and a higher rear end.

Each of the two holders 50 is a shock absorber mounted between the middle body 20 and the second body 30 and includes a cylinder 52 and a piston rod 54 retractably mounted on the cylinder 52. Each of the two holders 50 has a first end pivotally mounted on a respective one of the connecting members 25 of the seat tube 22 by a third pivot shaft 56 and a second end pivotally mounted on the second end of a respective one of the third arms 32 of the second body 30. In addition, a connecting line between the snap hole 34 and the third pivot shaft 56 passes through a space located under the first pivot shaft 23.

As shown in FIGS. 4 and 5, when the seat tube 22 of the middle body 20 is subjected to a downward force from a rider's weight, the middle body 20 is pivoted about the first pivot shaft 23 in the counterclockwise direction. In addition, the front wheel 70 and the rear wheel 80 are subjected to a reaction from the ground, so that the rear wheel 80 drives the second body 30 to rotate about the second pivot shaft 36 in the clockwise direction to compress the two holders 50 which apply a force on the middle body 20, so that the middle body 20 is also pivoted about the first pivot shaft 23 in the counterclockwise direction. At this time, the shock-absorbing device 40 applies a reaction on the first arm 24 of the middle body 20, so that the middle body 20 is pivoted about the first pivot shaft 23 in the clockwise direction.

In such a manner, the distance between the shock-absorbing device 40 and the first pivot shaft 23 is much greater than that between the seat tube 22 and the first pivot shaft 23 and is much greater than that between each of the two holders 50 and the first pivot shaft 23, so that the torque applied by the shock-absorbing device 40 is much greater than that applied by the rider's weight and the reaction of the ground. In addition, the shock-absorbing device 40 is substantially vertical to the first arm 24 of the middle body 20. Thus, the torque applied by the shock-absorbing device 40 on the middle body 20 can overcome that applied by the rider's weight and the reaction of the ground, so that the middle body 20 is supported rigidly and stably.

When the second body 30 is rotated about the second pivot shaft 36 in the clockwise direction, the wheel axle 82 of the rear wheel 80 is moved upward to drive a driven chain wheel 92 mounted on the wheel axle 82 to move upward. When the middle body 20 is pivoted about the first pivot shaft 23 in the counterclockwise direction, the pivot tube 28 is moved upward to drive the rotation shaft 96 mounted on the pivot tube 28 to move upward, so that the drive chain wheel 94 is moved upward. Thus, the drive chain wheel 94 and the driven chain wheel 92 are moved upward and forward simultaneously by rotation of the middle body 20 and the second body 30, so that the distance between the drive chain wheel 94 and the driven chain wheel 92 is kept at a constant.

Figure 6:
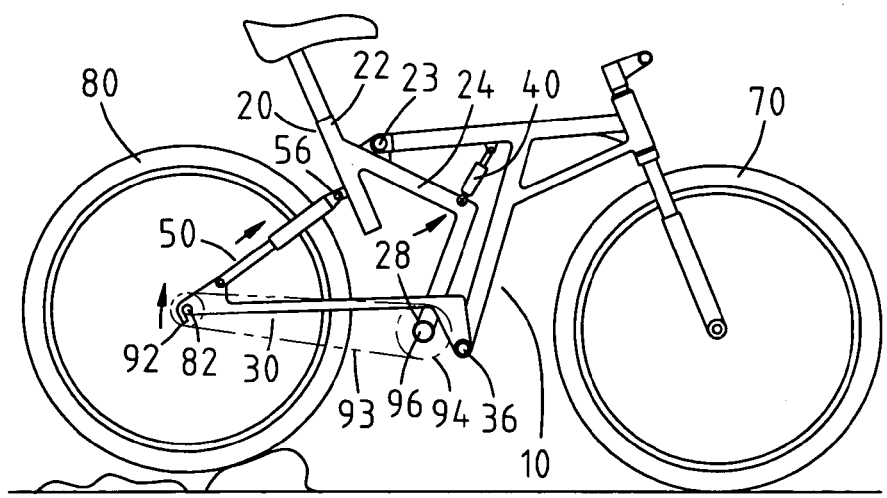
FIG. 6 is a schematic operational view of the shock-absorbing frame for a bicycle as shown in FIG. 5.

Referring to FIG. 6, when the bicycle is ridden on a rugged road, the rear wheel 80 is subjected to a reaction from the ground to drive the first body 10 and the second body 30 to rotate about the second pivot shaft 36 to compress the two holders 50 which apply a force on the middle body 20, so that the middle body 20 is also pivoted about the first pivot shaft 23. In addition, the two holders 50 are compressed to provide a shock-absorbing effect. In addition, the drive chain wheel 94 and the driven chain wheel 92 are moved upward and forward simultaneously by rotation of the middle body 20 and the second body 30, so that the distance between the drive chain wheel 94 and the driven chain wheel 92 is kept at a constant.

Accordingly, when the bicycle is subjected to a force, the middle body 20 and the second body 30 are rotated on the opposite directions, and the drive chain wheel 94 and the driven chain wheel 92 are moved upward and forward simultaneously, so that the distance between the drive chain wheel 94 and the driven chain wheel 92 is kept at a constant, thereby preventing the chain 93 mounted between the drive chain wheel 94 and the driven chain wheel 92 from becoming loosened or detached, so that the chain 93 is mounted between the drive chain wheel 94 and the driven chain wheel 92 rigidly and stably without detachment so as to protect the rider's safety.

Figure 7:
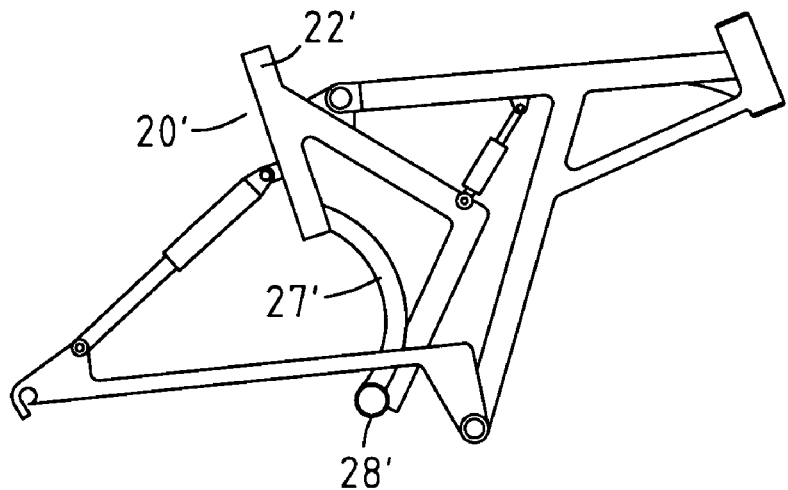
FIG. 7 is a side plan view of a shock-absorbing frame in accordance with a second embodiment of the present invention.

Referring to FIG. 7, a shock-absorbing frame in accordance with a second embodiment of the present invention further comprises an arc-shaped reinforcement 27' having a first end mounted on the seat tube 22' of the middle body 20' and a second end mounted on the pivot tube 28'.

Figure 8:
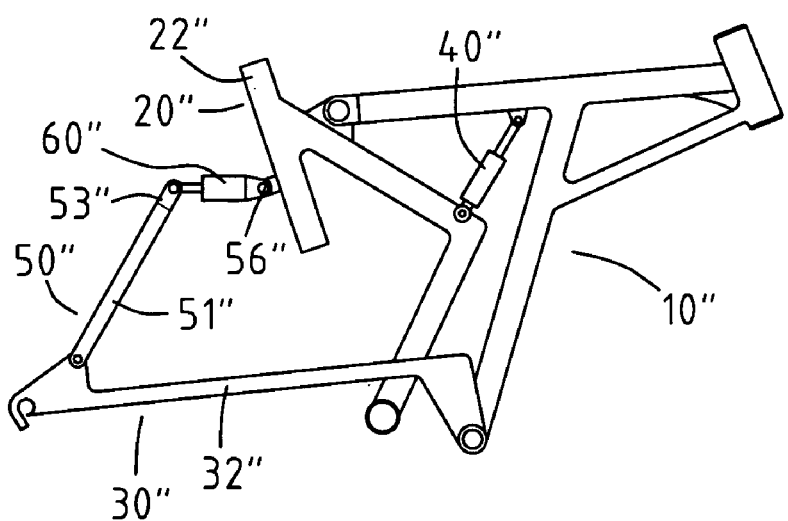
FIG. 8 is a side plan view of a shock-absorbing frame in accordance with a third embodiment of the present invention.

Referring to FIG. 8, a shock-absorbing frame in accordance with a third embodiment of the present invention comprises a first body 10", a middle body 20", a first shock-absorbing device 40", a second body 30", a rear fork 50", and a second shock-absorbing device 60".

The construction of the first body 10", the middle body 20", the first shock-absorbing device 40" and the second body 30" are the same as that of the first embodiment of the present invention as shown in FIG. 4 and will not be further described in detail.

The rear fork 50" includes two levers 51" each having a first end pivotally mounted on the second end of a respective one of the third arms 32 of the second body 30 and a second end formed with a connecting post 53".

The second shock-absorbing device 60" is mounted between the middle body 20" and the rear fork 50" and has a first end pivotally mounted on the seat tube 22" of the middle body 20" by a third pivot shaft 56" and a second end pivotally mounted on the connecting post 53" of each of the two levers 51" of the rear fork 50".

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A shock-absorbing frame for a bicycle, comprising a first body, a middle body, a shock-absorbing device, a second body, and two holders, wherein:

the first body includes a top tube having a first end portion, a mediate portion and a second end portion, and a positioning member having a first end integrally formed on a mediate portion of the top tube and a second end extended downward and backward in an oblique manner;

the middle body is pivotally mounted on the top tube of the first body and includes a seat tube located beside the second end of the top tube of the first body, a first arm pivotally mounted on the second end of the top tube of the first body by a first pivot shaft and having a first end mounted on a mediate portion of the seat tube and a second end extended downward and forward in an oblique manner, and a second arm having a first end mounted on the second end of the first arm and a second end extended downward and backward in an oblique manner;

the shock-absorbing device is mounted between the first body and the middle body and has a first end pivotally mounted on the mediate portion of the top tube and a second end pivotally mounted on the second end of the first arm;

the second body is pivotally mounted on the positioning member of the first body and includes two third arms each having a first end pivotally mounted on the second end of the positioning member of the first body by a second pivot shaft and a second end formed with a snap hole; and each of the two holders is mounted between the middle body and the second body.

2. The shock-absorbing frame in accordance with claim 1, wherein the first body further includes the head tube mounted on the first end of the top tube for mounting a front fork.

3. The shock-absorbing frame in accordance with claim 1, wherein the first body further includes a reinforcement member having a first end mounted on the head tube and located under the top tube, and a second end mounted on a mediate portion of the positioning member and located adjacent to the top tube.

4. The shock-absorbing frame in accordance with claim 1, wherein the seat tube, the first arm and the second arm are formed integrally.

5. The shock-absorbing frame in accordance with claim 1, wherein the seat tube of the middle body is extended downward and forward in an oblique manner for mounting a seat post.

6. The shock-absorbing frame in accordance with claim 1, wherein the top tube of the first body has a forked second end formed with two axially extended ears, the first end of the first arm of the middle body is formed with a pivot member pivotally mounted between the two ears of the top tube by the first pivot shaft, so that the middle body is pivoted about the first pivot shaft.

7. The shock-absorbing frame in accordance with claim 1, wherein the second end of the second arm of the middle body is formed with a pivot tube for mounting a rotation shaft of a drive chain wheel.

8. The shock-absorbing frame in accordance with claim 1, wherein the snap hole is pivotally snapped onto a wheel axle of a rear wheel.

9. The shock-absorbing frame in accordance with claim 1, wherein the second pivot shaft is located at a level lower than that of the snap hole, so that a connecting line between the second pivot shaft and the wheel axle of the rear wheel is disposed at an inclined state and has a lower front end and a higher rear end.

10. The shock-absorbing frame in accordance with claim 1, wherein each of the two holders has a first end pivotally mounted on the seat tube by a third pivot shaft and a second end pivotally mounted on the second end of a respective one of the third arms of the second body.

11. The shock-absorbing frame in accordance with claim 10, wherein a connecting line between the snap hole and the third pivot shaft passes through a space located under the first pivot shaft.

12. The shock-absorbing frame in accordance with claim 1, wherein the middle body and the second body are rotated relative to each other, so that a distance between a drive chain wheel mounted on the middle body and a driven chain wheel mounted on the second body is kept at a constant.

* * * * *